United States Patent
Fan

(10) Patent No.: US 10,594,544 B2
(45) Date of Patent: Mar. 17, 2020

(54) METHOD FOR MOVING LOGICAL RESOURCES WITHOUT EXPLICIT NEGOTIATIONS IN A HIGH AVAILABILITY, ACTIVE-ACTIVE SERVICE ROUTER CLUSTER

(71) Applicant: VMWARE, INC., Palo Alto, CA (US)

(72) Inventor: Kai-Wei Fan, San Jose, CA (US)

(73) Assignee: VMWare, Inc., Palo Alto, CA (US)

(*) Notice: Subject to any disclaimer, the term of this patent is extended or adjusted under 35 U.S.C. 154(b) by 0 days.

(21) Appl. No.: 16/037,969

(22) Filed: Jul. 17, 2018

(65) Prior Publication Data

US 2020/0028730 A1    Jan. 23, 2020

(51) Int. Cl.
| | |
|---|---|
| H04L 12/26 | (2006.01) |
| H04L 12/24 | (2006.01) |
| H04L 12/939 | (2013.01) |
| H04L 29/12 | (2006.01) |
| G06F 11/20 | (2006.01) |

(52) U.S. Cl.
CPC ...... *H04L 41/0668* (2013.01); *G06F 11/2041* (2013.01); *H04L 41/065* (2013.01); *H04L 41/0816* (2013.01); *H04L 41/0893* (2013.01); *H04L 43/0817* (2013.01); *H04L 49/557* (2013.01); *H04L 61/2007* (2013.01)

(58) Field of Classification Search
CPC ............. H04L 41/00668; H04L 41/065; H04L 41/0816; H04L 43/0817; H04L 49/557; H04L 61/2007; H04L 61/103; H04L 61/256; H04L 61/2592
See application file for complete search history.

(56) References Cited

U.S. PATENT DOCUMENTS

| | | |
|---|---|---|
| 10,250,562 B1 | 4/2019 | Srinath |
| 2008/0186968 A1* | 8/2008 | Farinacci ............ H04L 12/4633 370/392 |
| 2008/0212483 A1 | 9/2008 | Zhang |

(Continued)

OTHER PUBLICATIONS

X-IO Technologies, "VMware vSphere Stretched Cluster with X-IO Technologies ISE using Active-Active Mirroring" dated May 2014, 43 pages.

(Continued)

*Primary Examiner* — Minh Trang T Nguyen
(74) *Attorney, Agent, or Firm* — Hickman Palermo Becker Bingham LLP; Malgorzata A. Kulczycka

(57) ABSTRACT

A method for a service router ("SR") implemented in an active-active SR cluster to move logical resources without explicit negotiations between the service routers ("SRs") in the cluster to provide high availability of services is disclosed. In an embodiment, the method comprises: determining, by an active SR of a plurality of SRs implemented in an active-active SR cluster, that a particular SR has failed; and obtaining, by the active SR, a plurality of hash values computed for the particular SR. The plurality of hash values comprises hash values for the active SR. The active SR determines a maximum hash value of the plurality of hash values, and if the maximum hash value corresponds to, and only to, the hash value determined for the active SR, then the active SR configures a port IP address of the particular SR on the active SR.

20 Claims, 7 Drawing Sheets

(56) References Cited

U.S. PATENT DOCUMENTS

| | | | |
|---|---|---|---|
| 2009/0154340 A1* | 6/2009 | Kumaresan | H04L 45/02 370/218 |
| 2009/0285090 A1 | 11/2009 | Allasia | |
| 2010/0023632 A1 | 1/2010 | Liu | |
| 2012/0155283 A1 | 6/2012 | Sanguineti | |
| 2013/0322232 A1 | 12/2013 | Csaszar | |
| 2013/0343174 A1 | 12/2013 | Guichard | |
| 2014/0016457 A1 | 1/2014 | Enyedi | |
| 2014/0078887 A1 | 3/2014 | Yu | |
| 2014/0294005 A1* | 10/2014 | Jain | H04L 45/586 370/392 |
| 2016/0072702 A1* | 3/2016 | Gao | H04L 45/24 370/235 |
| 2016/0191613 A1 | 6/2016 | Srinivasan | |
| 2018/0006995 A1* | 1/2018 | Bickhart | H04L 12/4625 |
| 2018/0063731 A1 | 3/2018 | Ashrafi | |

OTHER PUBLICATIONS

VMWARE, "VMware High Availability", Concepts, Implementation, and Best Practices, dated 2007, 30 pages.

"Overview of NSX-T", http://pubs.vmware.com/nsxt-11/topic/com.vmware.nsxt.admin.doc/GU, last viewed on May 30, 2018, 2 pages.

Fan, U.S. Appl. No. 16/048,107, filed Jul. 27, 2018, Notice of Allowance, dated Aug. 26, 2019.

* cited by examiner

FIG. 3

| 300 Hash Values Pre-Computed by SR0 | |
|---|---|
| For SR1: | Hash (SR1 rank, SR0 rank)<br>Hash (SR1 rank, SR2 rank)<br>Hash (SR1 rank, SR3 rank) |
| For SR2: | Hash (SR2 rank, SR0 rank)<br>Hash (SR2 rank, SR1 rank)<br>Hash (SR2 rank, SR3 rank) |
| For SR3: | Hash (SR3 rank, SR0 rank)<br>Hash (SR3 rank, SR1 rank)<br>Hash (SR3 rank, SR2 rank) |

| 301 Hash Values Pre-Computed by SR1 | |
|---|---|
| For SR0: | Hash (SR0 rank, SR1 rank)<br>Hash (SR0 rank, SR2 rank)<br>Hash (SR0 rank, SR3 rank) |
| For SR2: | Hash (SR2 rank, SR0 rank)<br>Hash (SR2 rank, SR1 rank)<br>Hash (SR2 rank, SR3 rank) |
| For SR3: | Hash (SR3 rank, SR0 rank)<br>Hash (SR3 rank, SR1 rank)<br>Hash (SR3 rank, SR2 rank) |

| 302 Hash Values Pre-Computed by SR2 | |
|---|---|
| For SR0: | Hash (SR0 rank, SR1 rank)<br>Hash (SR0 rank, SR2 rank)<br>Hash (SR0 rank, SR3 rank) |
| For SR1: | Hash (SR1 rank, SR0 rank)<br>Hash (SR1 rank, SR2 rank)<br>Hash (SR1 rank, SR3 rank) |
| For SR3: | Hash (SR3 rank, SR0 rank)<br>Hash (SR3 rank, SR1 rank)<br>Hash (SR3 rank, SR2 rank) |

| 303 Hash Values Pre-Computed by SR3 | |
|---|---|
| For SR0: | Hash (SR0 rank, SR1 rank)<br>Hash (SR0 rank, SR2 rank)<br>Hash (SR0 rank, SR3 rank) |
| For SR1: | Hash (SR1 rank, SR0 rank)<br>Hash (SR1 rank, SR2 rank)<br>Hash (SR1 rank, SR3 rank) |
| For SR2: | Hash (SR2 rank, SR0 rank)<br>Hash (SR2 rank, SR1 rank)<br>Hash (SR2 rank, SR3 rank) |

FIG. 4

400 Hash Values Pre-Computed by SR0

For SR1:  Hash (SR1 rank, SR0 rank) = $H_{10}$
          Hash (SR1 rank, SR2 rank) = $H_{12}$
          Hash (SR1 rank, SR3 rank) = $H_{13}$ For SR2:  Hash (SR2 rank, SR0 rank) = $H_{20}$
          Hash (SR2 rank, SR1 rank) = $H_{21}$
          Hash (SR2 rank, SR3 rank) = $H_{23}$ For SR3:  Hash (SR3 rank, SR0 rank) = $H_{30}$
          Hash (SR3 rank, SR1 rank) = $H_{31}$
          Hash (SR3 rank, SR2 rank) = $H_{32}$

FIG. 6

| 604 Service Routers | SR0 | SR1 | SR2 | SR3 |
|---|---|---|---|---|
| 606 Yes, I own this IP address (Vector) | 1 | 0 | 0 | 0 |

602 Example IP address ownership vector maintained by SR0 before SR2 fails

| 614 Service Routers | SR0 | SR1 | SR2 | SR3 |
|---|---|---|---|---|
| 616 Yes, I own this IP address (Vector) | 1 | 0 | 1 | 0 |

612 Example IP address ownership vector maintained by SR0 after SR2 fails and SR0 configures a port IP address of SR2 on SR0

| 624 Service Routers | SR0 | SR1 | SR2 | SR3 |
|---|---|---|---|---|
| 626 Yes, I own this IP address (Vector) | 1 | 0 | 0 | 0 |

622 Example IP address ownership vector maintained by SR0 after SR2 comes back and SR0 releases the port IP address of SR2

METHOD FOR MOVING LOGICAL RESOURCES WITHOUT EXPLICIT NEGOTIATIONS IN A HIGH AVAILABILITY, ACTIVE-ACTIVE SERVICE ROUTER CLUSTER

BACKGROUND

High availability devices, such as service routers, may be grouped into an active-active service router cluster. The service routers ("SRs") in the cluster may work as a team to provide services even if some of the routers in the cluster fail. As long as at least one of the SRs remains active, the cluster may provide the services configured on the SRs. Examples of the services may include load balancing, traffic forwarding, data packet processing, VPN services, DNS services, and the like.

Health of a SR is usually measured by the router's ability to provide the services configured on the router. Information about the health of the routers in a cluster may be exchanged between the routers to allow the active routers to detect the routers that have failed. If some routers in the cluster fail, then some of the surviving active routers need to assume the responsibility for providing the services that were configured on the failed routers.

Unfortunately, determining which surviving SRs should assume responsibilities for providing services that were configured on a failed router is usually difficult and time consuming. For example, if all but two SRs fail in a multi-SR cluster, then none of the two surviving SRs should become solely responsible for all services that were configured on the failed SRs. Therefore, it is desirable to develop an improved method for distributing the services that were configured on the failed SRs to the surviving SRs.

SUMMARY

In an embodiment, an approach is provided for selecting an active SR, from a plurality of SRs, implemented in a high availability active-active SR cluster, that needs to assume responsibilities of a failed SR for providing the services that were configured on the failed SR. The approach allows making the selection quickly and efficiently to minimize the impact that the SR's failure would otherwise have on data traffic communicated via the cluster.

In an embodiment, the approach improves distributing the services that were configured a failed router to surviving SRs in a SR cluster. The approach also improves the reliability of the cluster, decreases downtime in accessing the services provided by the cluster, and speeds up a disaster recovery should such occur in the cluster.

In an embodiment, the approach includes techniques for moving logical resources without explicit negotiations between SRs in a high availability active-active SR cluster. In the context of the SR clusters, high availability ensures that the services provided by the SRs are available even if some of the SRs fail.

In an embodiment, the approach includes moving logical resources, such as a port IP address of a failed SR, of an active-active SR cluster, to a surviving active SR in the cluster without explicit negotiations between the SRs in the cluster.

BRIEF DESCRIPTION OF THE DRAWINGS

In the drawings:

FIG. 3 is a block diagram depicting examples of hash values computed by example service routers.

FIG. 4 is a block diagram depicting an example set of hashes.

FIG. 6 is a block diagram depicting an example IP address ownership vector.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
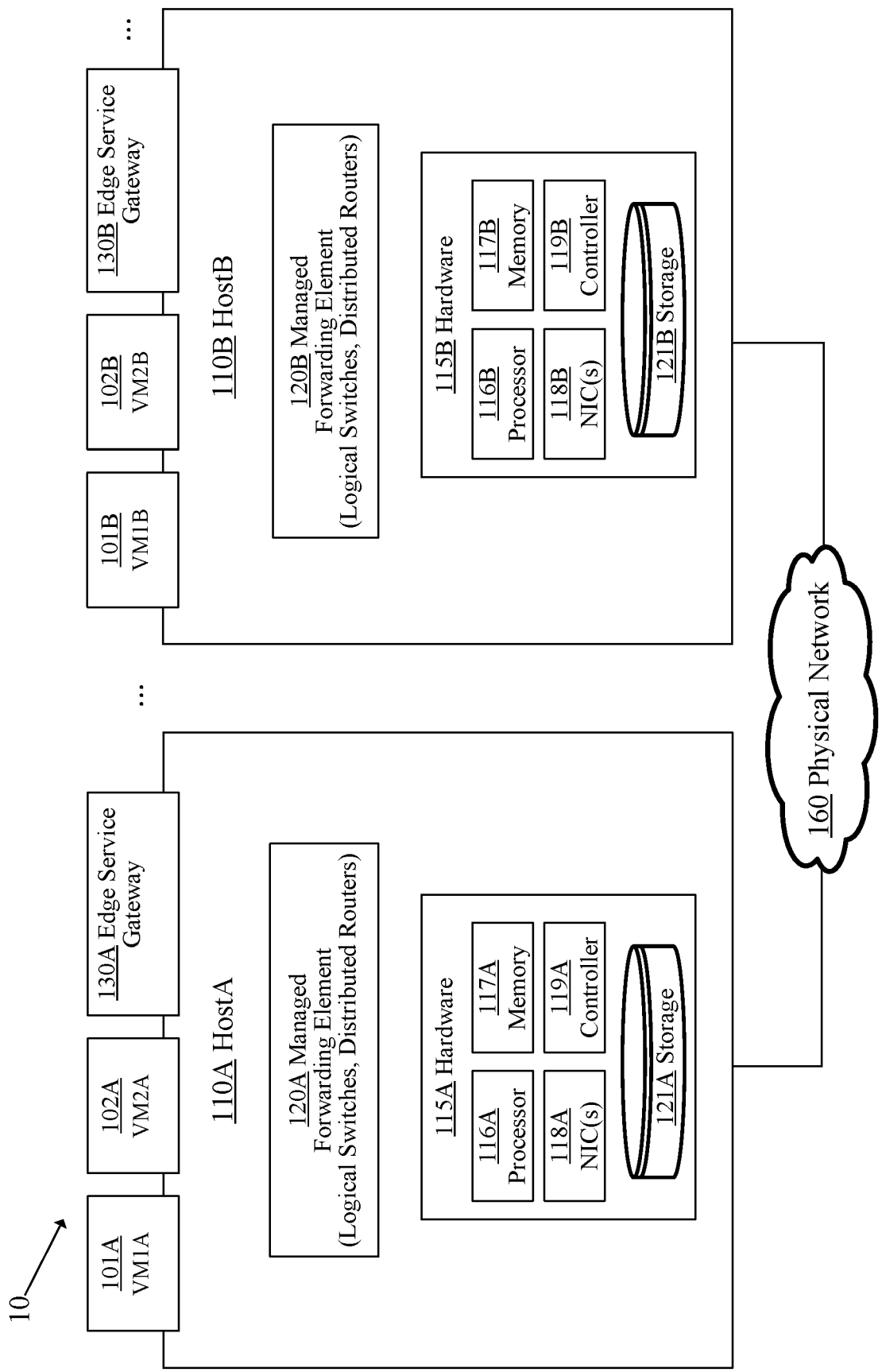
FIG. 1 is a block diagram depicting an example physical implementation view of an example logical network environment for moving logical resources without explicit negotiations in an active-active SR cluster to provide high availability of services.

FIG. 1 is a block diagram depicting an example physical implementation view of an example logical network environment for moving logical resources without explicit negotiations in an active-active SR cluster to provide high availability of services. In the depicted example, environment 10 includes one or more hosts 110A and 110B, and one or more physical networks 160. Environment 10 may include additional hosts and additional nodes not depicted in FIG. 1.

Hosts 110A and 110B may be configured to implement virtual machines ("VMs"), edge service gateways, logical routers, logical switches, and the like. Hosts 110A and 110B are also referred to as computing devices, host computers, host devices, physical servers, server systems, or physical machines.

In the example depicted in FIG. 1, host 110A is configured to support an VM1A 101A, an VM2A 102A, and an edge service gateway 130A; while host 110B is configured to support an VM1B 101B, an VM2B 102B, and an edge service gateway 130B. The hosts may support additional VMs and additional gateways not depicted in FIG. 1.

Virtual machines VM1A-VM2B executed on hosts 110A-110B, respectively, are examples of virtualized computing instances or workloads. A virtualized computing instance may represent an addressable data compute node or an isolated user space instance.

An edge service gateway is a virtualized network component that may be configured to provide edge security and gateway services to VMs and hosts. It may be implemented as a logical router or as a service gateway, and may provide dynamic routing services, firewall services, NAT services, DHCP services, site-to-site VPN services, L2 VPN services, load balancing services, and the like.

In the depicted example, edge service gateways 130A and 130B may implement for example, gateways configured to process and forward data traffic to, and from, VMs and hosts.

Edge service gateways 130A and 130B may implement one or more SRs (depicted in FIG. 2, but not in FIG. 1) configured to provide various services to for example, VM1A-VM2B. Each SR may be configured with one or more ports, and each port may have assigned its own IP address for addressing the services that the SR provides. Examples of SRs are described in FIG. 2.

In an embodiment, hosts 110A-110B are configured to support execution of hypervisors (not depicted in FIG. 1) and execution of managed forwarding elements 120A and 120B, respectively.

Managed forwarding elements 120A and 120B may be configured to perform forwarding of data packets that are received from, or sent to, VMs and/or edge service gateways. For example, if managing forwarding element 120A executing on host 110A receives a data packet from VM1A 101A, then managing forwarding element 120A may perform the processing for a logical switch that is logically coupled to VM1A 101A, to direct the packet to for example, edge service gateway 130A.

Each of hosts 110A and 110B includes one or more hardware components 115A/115B. Hardware components 115A/115B may include one or more processors 116A/116B, one or more memory units 117A/117B, one or more network interface controllers 118A/118B, one or more controllers 119A/119B, and/or one or more storage devices 121A/121B. Hardware components 115A/115B may include additional elements not depicted in FIG. 1.

2. Moving Logical Resources without Explicit Negotiations

Figure 2:
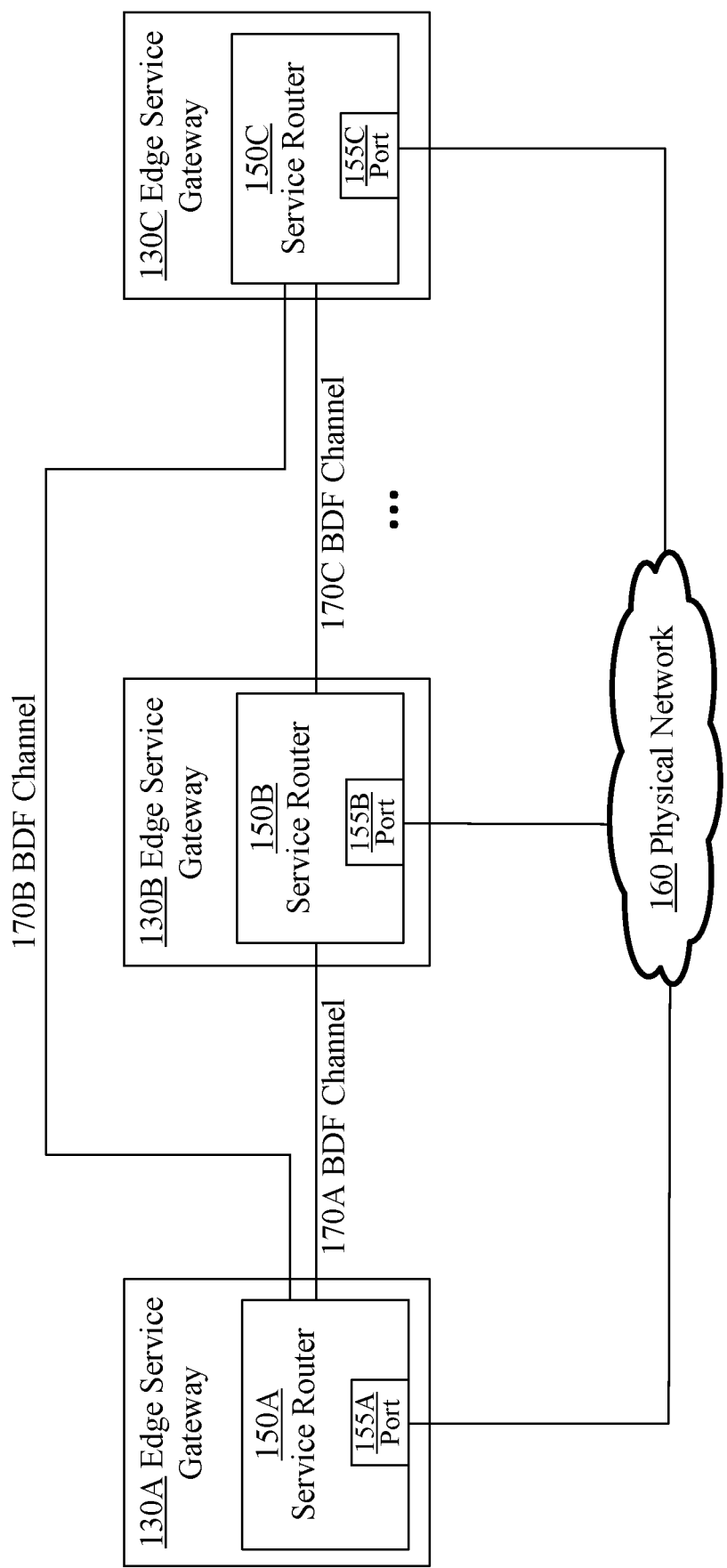
FIG. 2 is a block diagram depicting an example implementation of moving logical resources without explicit negotiations in an active-active SR cluster.

FIG. 2 is a block diagram depicting an example implementation of moving logical resources without explicit negotiations in a high-availability active-active SR cluster. In the depicted example, an active-active SR cluster includes a plurality of SRs, such as 150A, 150B, and 150C, that are implemented in respective edge service gateways 130A, 130B, and 130C.

In an embodiment, each of SRs 150A, 150B, 150C is configured with one or more ports, and each port has assigned its own IP address for addressing the services that the SR provides. In the example depicted in FIG. 2, SR 150A is configured with a port 155A, SR 150B is configured with a port 155B, and SR 150C is configured with a port 155C. In other examples, SRs 150A-150C may be configured with multiple ports.

When a SR is active, then communications intended to the SR may be directed to the port of the SR having the assigned port IP address. If one of the SRs fails, then one or more port IP addresses of the failed SR need to be configured on one or more surviving active SRs, causing the active SRs to have at least two port IP addresses, including its own port IP address and one of the port IP addresses of the failed SR.

A count of port IP addresses that a single SR can support depends on the implementation and on a count of surviving SRs. In situations when all but one SR fail, one SR may be configured with all port IP address of all SRs implemented in a SR cluster.

In an embodiment, each SR in an active-active SR cluster establishes bidirectional forwarding detection ("BFD") sessions with all other SRs in the cluster to detect whether any of the SRs has failed. The BFD is a network protocol used to detect faults between two forwarding appliances connected by a communications link. It provides a low-overhead detection of faults by either monitoring "hello" packets exchanged between the appliances (an asynchronous mode), or explicitly verifying connectivity with other SRs (a demand mode).

SRs 150A, 150B, and 150C may be connected with each other via one or more BFD channels, such as BFD channels 170A, 170B, and 170C. The BFD channels may be used by SRs 150A, 150B, and 150C to exchange "hello" messages to communicate to each other their own health information. If for example, SR 150C fails, then SR 150C is unable to transmit its own "hello" messages via the BFD channels to other SRs. After a certain time period, SRs 150A and 150B detect that they have not received any "hello" messages from SR 150C during the certain time period. Subsequently, SRs 150A and 150B will determine that SR 150C has failed.

In an embodiment, each SR of an active-active SR cluster receives information about ranks and port IP addresses of all SRs. The ranks represent the relative importance of the SRs in the cluster, and are usually expressed as non-negative numbers with a rank of zero being the highest rank. The ranks are usually assigned to the SRs by a software defined network ("SDN") manager or by users. Once the SRs are deployed, the assignment of ranks to the SRs usually does not change.

3. Example Process for Computing Hash Values

In an embodiment, a process of moving logical resources without explicit negotiations between SRs in a high availability, active-active SR cluster starts with computing hash values by the SRs. Each SR in the cluster may compute, based on the received rank information, a set of hash values. If the active-active SR cluster includes for example, four SRs, then an SR computes a set of three subsets of hash values, where each of the subsets is computed for one of the three other SRs. The hashing function may include a bit permutation, shift, xor, and/or multiplication.

FIG. 3 is a block diagram depicting examples of hash values computed by example SRs. In the depicted example, it is assumed that an active-active SR cluster comprises four SRs: a SR0, a SR1, a SR2, and a SR3. Each of the SRs computes its own a set of three subsets of hash values for the other SRs for situations when any of the other SRs becomes inactive.

A hash value computed for two SRs represents a hashed rank relationship between the two routers. A hash value may be computed by applying a hash function to two ranks assigned to two corresponding SRs. The hash function may be any type of hash function that includes Boolean expressions or other expressions that may be applied to rank values.

In the depicted example, the active-active SR cluster includes four SRs, and each of the SRs computes a set of nine hash values that are grouped into three subsets. Each subset includes three hash values. In other examples, SRs may compute different counts of hash values.

Suppose that an active-active SR cluster includes four SRs: a SR0, a SR1, a SR2, and a SR3. Each of the SRs will precompute a set of three subsets of hash values, where each subset is for a different SR. For example, the SR0 may compute a set of hashes that includes three subsets: a first subset for the SR1 in case the SR1 becomes inactive, a second subset for the SR2 in case the SR2 becomes inactive, and a third subset for the SR3 in case the SR3 becomes inactive. The first subset that the SR0 computes for the SR1 may include three hash values: a hash value that represents a hashed rank relationship between the SR1's rank and the SR0's rank, a hash value that represents a hashed rank relationship between the SR1's rank and the SR2's rank, and a hash value that represents a hashed rank relationship between the SR1's rank and the SR3's rank. The SR0 may use the first subset of the three hash values to determine whether the SR0 needs to configure a port IP address of the SR1 when/if the SR1 fails. The SR0 may use the second subset of the three hash values to determine whether the SR0 needs to configure a port IP address of the SR2 when/if the SR2 fails. The SR0 may use the third subset of the three hash values to determine whether the SR0 needs to configure a port IP address of the SR3 when/if the SR3 fails. Using a similar approach, the SR1, the SR2 and the SR3 precompute their own sets of hash values. Therefore, if the cluster includes four SRs, then each of the SRs will compute nine hashes, and will use the hashes when/if any of the other SRs actually fails.

Alternatively, SRs may compute their own hashes when a failure of a SR is detected.

As depicted in FIG. 3, the SR0 computes a set 300 that includes nine hash values: three hash values for the SR1 computed for the SR1 in case the SR1 becomes inactive, three hash values for the SR2 computed for the SR2 in case the SR2 becomes inactive, and three hash values for the SR3 computed for the SR3 in case the SR3 becomes inactive.

The SR1 computes a set 301 that includes nine hash values: three hash values for the SR0 computed in case the SR0 becomes inactive, three hash values for the SR2 computed in case the SR2 becomes inactive, and three hash values for the SR3 computed in case the SR3 becomes inactive.

The SR2 computes a set 302 that includes nine values: three hash values for the SR0 computed in case the SR0 becomes inactive, three hash values for the SR1 computed in case the SR1 becomes inactive, and three hash values computed for the SR3 in case the SR3 becomes inactive.

The SR3 computes a set 303 that includes nine hash values: three hash values for the SR0 computed in case the SR0 becomes inactive, three hash values for the SR1 computed in case the SR1 becomes inactive, and three hash values for the SR2 computed in case the SR2 becomes inactive.

4. Example Hash Values

FIG. 4 is a block diagram depicting an example set of hashes 400. In the depicted example, hashes 400 were computed by a SR0.

As shown in FIG. 4, set 400 includes nine hashes grouped into three subsets: a subset of hashes computed for a SR1, a subset of hashes computed for a SR2, and a subset of hashes computed for the SR3. The hashes computed for SR1 include: $H_{10}$, $H_{12}$, and $H_{13}$; where $H_{10}$ represents a hashed rank relationship between the SR1 and the SR0, $H_{12}$ represents a hashed rank relationship between the SR1 and the SR2, and $H_{13}$ represents a hashed rank relationship between the SR1 and the SR3. If the SR1 fails, then the SR0 may use $H_{10}$, $H_{12}$, and $H_{13}$ to determine whether the SR0 should configure a port IP address of the SR1 on the SR0.

The hashes computed for SR2 include: $H_{20}$, $H_{21}$, and $H_{23}$; where $H_{20}$ represents a hashed rank relationship between the SR2 and the SR0, $H_{21}$ represents a hashed rank relationship between the SR2 and the SR1, and $H_{23}$ represents a hashed rank relationship between the SR2 and the SR3. If the SR2 fails, then the SR0 may use $H_{20}$, $H_{21}$, and $H_{23}$ to determine whether the SR0 should configure a port IP address of the SR2 on the SR0.

The hashes computed for SR3 include: $H_{30}$, $H_{31}$, and $H_{32}$; where $H_{30}$ represents a hashed rank relationship between the SR3 and the SR0, $H_{31}$ represents a hashed rank relationship between the SR3 and the SR1, and $H_{32}$ represents a hashed rank relationship between the SR3 and the SR2. If the SR3 fails, then the SR0 may use $H_{30}$, $H_{32}$, and $H_{32}$ to determine whether the SR0 should configure a port IP address of the SR3 on the SR0.

5. Example Workflow for Moving Logical Resources without Explicit Negotiations when a Failure of a Service Router is Detected When a SR fails, one or more port IP addresses of the failed SR need to be surrendered to one or more surviving active SRs. Surrendering a port IP address from one SR to another SR is referred to as an IP address move, or just an IP move. Selecting a surviving active SR on which the port IP address of the failed SR is to be configured is performed based on hashes that the SRs computed based on the ranks.

In an embodiment, failure of a SR in an active-active SR cluster is detected through BFD communications sessions. Once failure of a particular SR in the cluster is detected, each surviving active SR can retrieve its own precomputed hashes. If the hashes have not been precomputed or are not available to a surviving SR, then the SR may compute the hashes on-a-fly when the failure of another SR is detected.

Once a surviving SR retrieves, or determines, its own set of hashes, the SR determines whether the SR should configure a port IP address of the failed SR. Each of the surviving SRs makes that determination independently from other SRs. A SR only needs to determine whether the SR should configure the port IP address of the failed SR. None of the SRs negotiates with other SRs to determine which SR needs to configure the port IP address of the failed SR. Since each of the SRs only checks if it needs to configure the port IP address of the failed SR, the IP move process is fast and efficient.

In an embodiment, an active SR determines that it needs to configure a port IP address of a failed SR if, based on comparing the hash values computed for the failed SR, the active SR determines that its own hash value is the maximum of all hash values for all remaining active SRs. If this condition is not met, then the active SR continues performing its own tasks, and does not inquire which other active SR will configure the port IP address of the failed SR.

Figure 5:
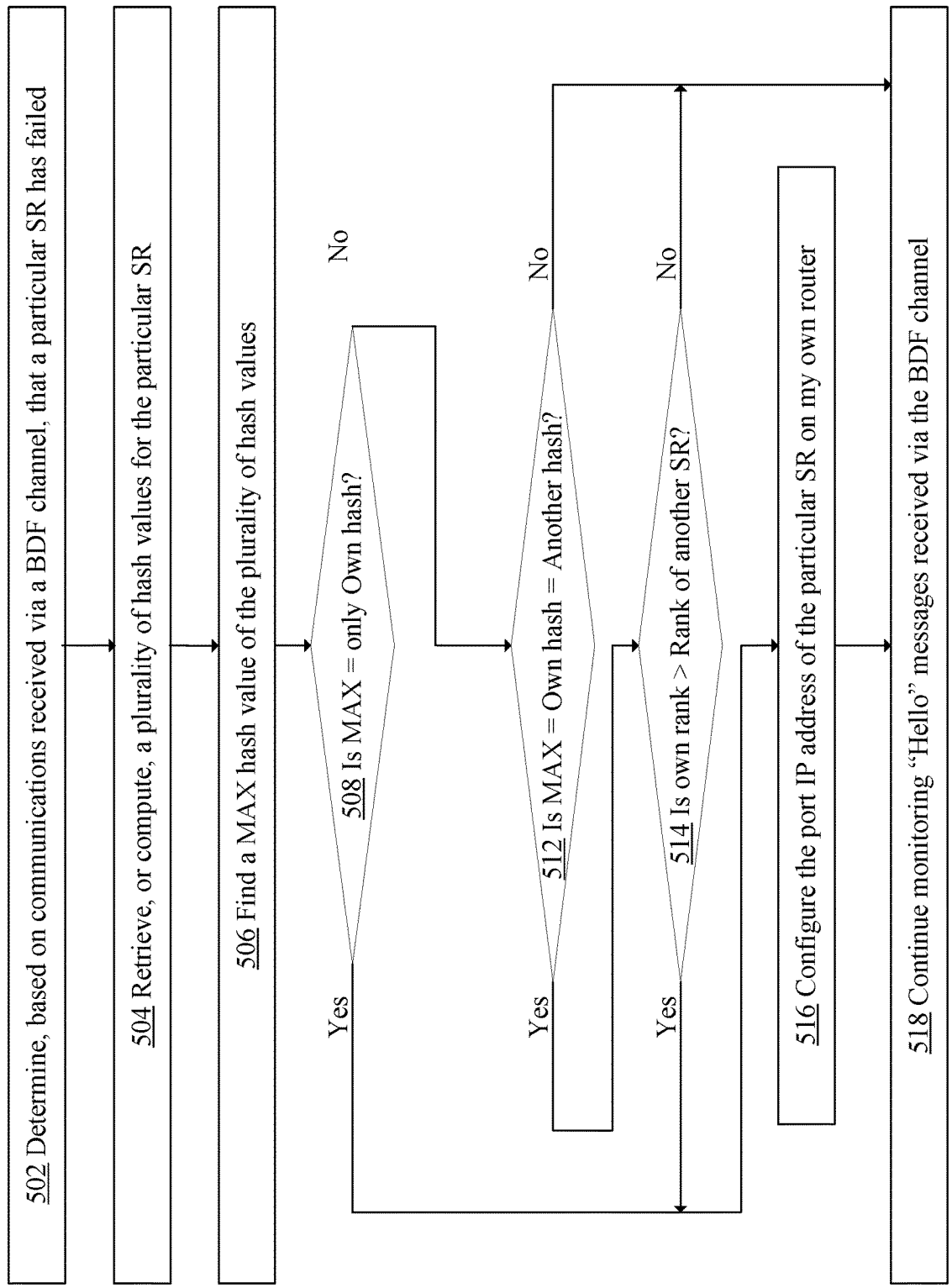
FIG. 5 is an example flow chart for moving logical resources without explicit negotiations when a failure of a service router is detected.

FIG. 5 is an example flow chart for moving logical resources without explicit negotiations when a failure of a SR is detected. In an embodiment, the steps described in FIG. 5 are performed individually by each of active SRs in an active-active SR cluster.

For example, if an active-active SR cluster includes four SRs (SR0, SR1, SR2, and SR3), and the SR0, SR1 and SR3 are active, while the SR2 has failed, then each of the SR0, SR1 and SR3 will individually perform the steps described in FIG. 5. Each of the SR0, SR1 and SR3 will perform the steps described in FIG. 5 individually and independently of other SRs, and the purpose of performing the steps is to determine, by each of the SR0, SR1 and SR3 independently from other SRs, whether it should configure one or more port IP addresses of the failed SR2 on its own port. For example, if by performing the steps described in FIG. 5, the SR0 determines that the SR0 needs to configure a port IP address of the failed SR2 on the SR0, then the SR0 proceeds with the configuration, while the SR1 and SR3, independently from other SRs determine that they are not responsible for configuring the port IP address of the SR2 on their own ports. Since selecting an active SRs for configuring the port IP address of the failed SR2 is based on the same information (ranks, and hash values computed as described in FIG. 3-4), each of the active SRs will perform the steps described in FIG. 5 only to determine if it needs to configure the port IP address of the SR2.

In the description below, a failed SR is referred to as a particular SR. The steps of FIG. 5 are performed independently by each of the active SRs that is configured in an active-active SR cluster.

In step 502, an active SR determines, based on communications received via a BFD channel, that a particular SR has failed. This may include for example, receiving an indication that the particular SR has not transmitted a "hello" message for a certain time period, and therefore, the active SR may assume that the particular SR has failed. According to another example, this may include receiving an indication that the particular SR failed to respond to a ping message within a certain time period, and therefore, the active SR may assume that the particular SR has failed.

In step 504, the active SR retrieves a plurality of hash values for the particular, failed SR. In an embodiment, hash values are precomputed in advance. For example, the hash value may be precomputed once a SR receives, from a user or a management plane, information about ranks of the SRs implemented in an active-active SR cluster, and once the hashing function is available. The process of computing the hash values is described in FIG. 3.

Suppose that, in an active-active SR cluster comprising SR0, SR1, SR2, and SR3, the active SR corresponds to the SR0 described in FIG. 4, and the particular, failed SR corresponds to the SR2. Thus, the active SR0 may retrieve the hash values $H_{20}$, $H_{21}$, $H_{23}$, depicted in FIG. 4. The hash values $H_{20}$, $H_{21}$, $H_{23}$ correspond to hash values computed by applying a hashing function to ranks of the corresponding SR0, SR1, and SR3. The hash values $H_{20}$, $H_{21}$, $H_{23}$ may represent a "strength" of each of the active SRs in terms of ability to provide the services that were configured on the failed SR2.

However, if the hash values are not precomputed in advance, then a SR may compute the values when a failure of another SR is detected. Once the hash values are computed, the SR may store them in a local storage device for future references.

In step 506, the active SR determines a maximum hash value of the hash values that the active SR retrieved for the failed SR. For example, if, in an active-active SR cluster comprising SR0, SR1, SR2, and SR3, the active SR corresponds to the SR0, the failed SR corresponds to the SR2, and the retrieved hash values are $H_{20}$, $H_{21}$, $H_{23}$, then the SR0 will find a maximum hash value from the set of $H_{20}$, $H_{21}$, $H_{23}$.

In step 508, the active SR determines whether the maximum hash value corresponds to the SR's own hash value from the hash values. If it does, then the active SR determines whether the SR's own hash value is the only hash value that is the maximum hash value. For example, if, in an active-active SR cluster comprising SR0, SR1, SR2, and SR3, the active SR corresponds to the SR0, the failed SR corresponds to the SR2, and the retrieved hash values are $H_{20}$, $H_{21}$, $H_{23}$, then the SR0 determines whether the maximum hash value is $H_{20}$, and not $H_{21}$ or $H_{23}$.

If both conditions are met, then the active SR proceeds to performing step 516. Otherwise, the active SR proceeds to step 512.

In step 512, the active SR determines whether the maximum hash value corresponds to both the SR's own hash value and to a hash value of another active SR. For example, if, in an active-active SR cluster comprising SR0, SR1, SR2, and SR3, the active SR corresponds to the SR0, the failed SR corresponds to the SR2, and the retrieved hash values are $H_{20}$, $H_{21}$, $H_{23}$, then the SR0 determines whether a maximum hash value is both $H_{20}$ and $H_{21}$, or both $H_{20}$ and $H_{23}$. If that condition is met, then the active SR proceeds to performing step 514. Otherwise, the active SR proceeds to performing 518.

In step 514, the active SR determines whether a rank of the active SR is greater than a rank of another SR whose hash value was also a maximum hash value in the set. For example, if, in an active-active SR cluster comprising SR0, SR1, SR2, and SR3, the active SR corresponds to the SR0, the failed SR corresponds to the SR2, the retrieved hash values are $H_{20}$, $H_{21}$, $H_{23}$, and a maximum hash value are both $H_{20}$, $H_{21}$, then the SR0 determines whether its own rank is greater than the rank of the SR1. If that condition is met, then the active SR proceeds to performing step 516. Otherwise, the active SR proceeds to performing 518.

In step 516, the active SR determines that it is responsible for configuring, on the active SR, a port IP address of the failed SR. Once the active SR configures, on the active SR, the port IP address of the failed SR, the active SR may generate and send a GARP message to propagate the event to hypervisors implemented in host machines in the network.

Once the active SR configures the port IP address of the failed SR, the active SR assumes the responsibility of providing the services that were configured on the failed SR.

In step 518, the active SR continues monitoring communications exchanged via the BFD channels. This may include determining whether other SRs remain active, whether previously failed SRs came back and became active, and/or whether the active SR itself remains active.

The process described in steps 502-518 may be repeated each time an active SR receives, via BFD channels, an indication that another SR has failed.

The process described in steps 502-518 may be repeated by each active SR independently of other SRs. An active SR executes the steps 502-518 only to find out if it is responsible for configuring a port IP address of a failed SR. If the active SR determines that it needs to configure the port IP address of the failed SR, then the active SR does so. However, if the active SR determines that it is not responsible for configuring the port IP address of the failed SR, then the active SR continues its operations as usually, and does not inquire which other active SR is responsible for configuring the port IP address of the failed SR.

6. Example IP Address Ownership Vector

FIG. 6 is a block diagram depicting an example IP address ownership vector. An IP address ownership vector is a data structure that is maintained by a SR, and that is used to indicate for which port IP addresses of SRs implemented in an active-active SR cluster the SR is responsible. The data structure may be implemented as a binary vector, in which each bit corresponds to one of the SRs, and each bit value indicates whether the SR is responsible for configuring the port IP address of another SR. The data structure may also be implemented as a data table or a pointer-based data structure.

For example, in an active-active SR cluster that comprises SR0, SR1, SR2, and SR3, each of the SR0, SR1, SR2, and SR3 may maintain its own IP address ownership vector, and each of the IP address ownership vectors may include four bits. Each of the IP address ownership vector may be different than the IP address ownership vectors of other SRs. Depending on the type of convention implemented in the IP address ownership vectors, a bit value of "1" of the $n^{th}$ bit in an IP address ownership vector maintained by a particular SR may indicate that the particular SR "holds" a port IP address of the $n^{th}$ SR.

In the example depicted in FIG. 6, it is assumed that an active-active SR cluster comprises SR0, SR1, SR2 and SR3. Furthermore, it is assumed that a bit value of "1" of the $n^{th}$ bit in an IP address ownership vector maintained by a particular SR indicates that the particular SR has configured a port IP address of the $n^{th}$ SR. The depicted example may be easily expanded to any count of SRs, and may utilize any type of data structure configured to indicate associations between SRs and port IP addresses.

FIG. 6 depict three IP address ownership vectors: an IP address ownership vector 602 maintained by a SR0 before a SR2 failed, an IP address ownership vector 612 maintained by the SR0 after the SR2 failed, and an IP address ownership vector 622 maintained by the SR0 after the SR2 comes back and SR0 releases a port IP address of SR2. Each of the vectors is indexed by identifiers SR0, SR1, SR2 and SR3, respectively. For clarity of the description, the identifiers SR0, SR1, SR2 and SR3 are shown in rows 604, 614, and 624 above the respective vectors 602, 612, and 622.

Content 606 of IP address ownership vector 602 maintained by the SR0 before the SR2 failed indicates that the SR0 owns its own port IP address, and that the SR0 does not own any other port IP address.

Content 616 of IP address ownership vector 612 maintained by the SR0 after the SR2 failed indicates that the SR0 owns its own port IP address and a port IP address of the SR2 that failed.

Content 626 of IP address ownership vector 622 maintained by the SR0 after the SR2 comes back and SR0 releases a port IP address of SR2 indicates that the SR0 owns its own port IP address and that does not own any other port IP address. It is assumed here that once the SR2 became active again, the SR0 released the IP address of the SR2, and that the SR0 could do so because a rank of the SR0 was not greater than a rank of the SR2. This is described in detail in FIG. 7.

7. Example Workflow for Moving Logical Resources without Explicit Negotiations after a Service Router Recovers In an embodiment, if a particular SR recovers from a failed state, then the particular SR takes back its own IP addresses from another SR that temporarily hold the IP address of the particular SR. When a failed SR recovers and becomes active, it rejoins an active-active SR cluster by resuming communications, via BFD channels, with other peers, and thus making its own presence known to all peers. If a failed SR recovers and becomes active, all other active SRs determine whether they still hold the maximum hash value among all active SRs for all failed SR, as the just-recovered SR may now have the maximum hash value for some of the failed SRs.

Figure 7:
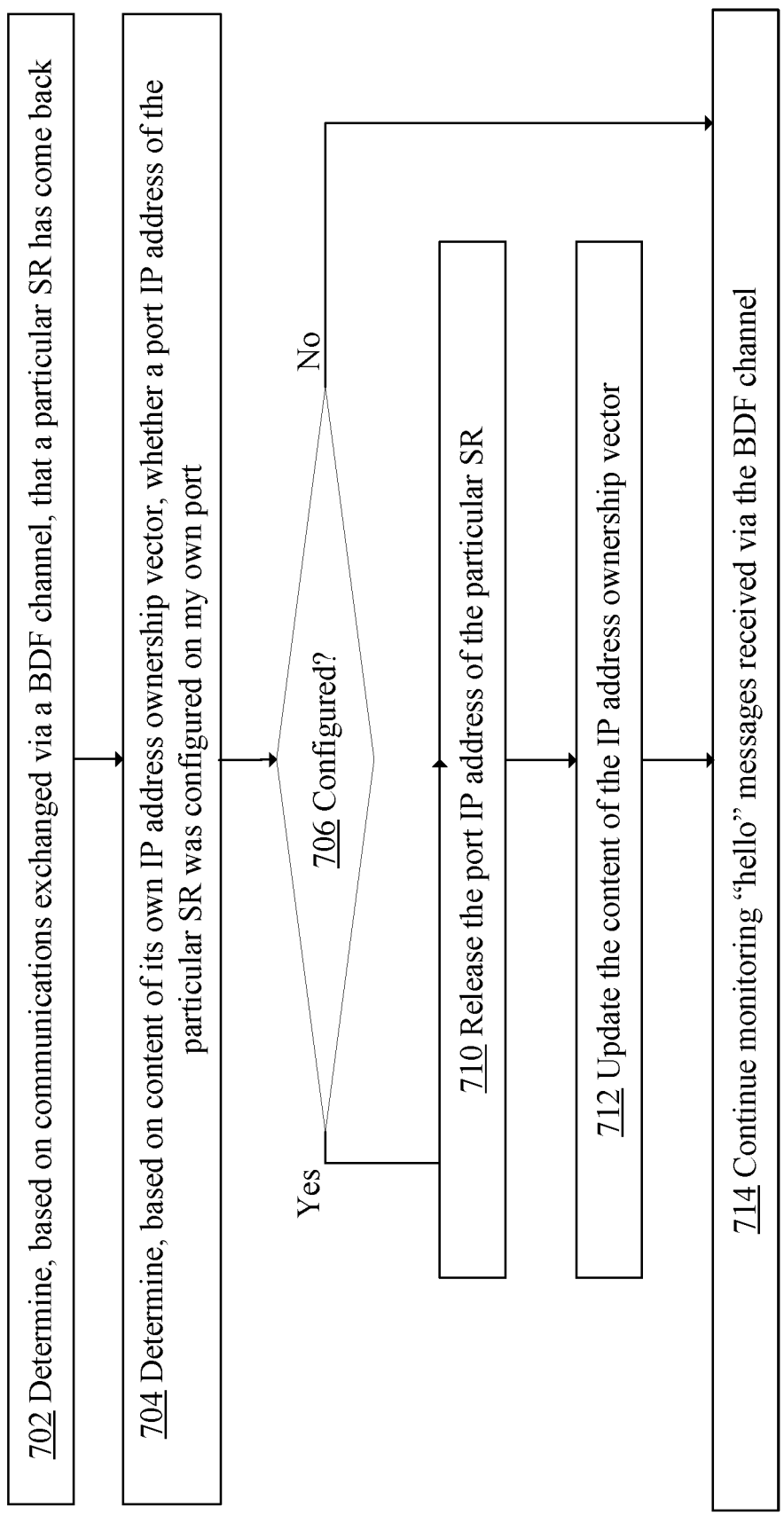
FIG. 7 is an example flow chart for moving logical resources without explicit negotiations after a service router recovers.

FIG. 7 is an example flow chart for moving logical resources without explicit negotiations after a SR recovers. In an embodiment, the steps described in FIG. 7 are performed individually by each of the SRs that is active in an active-active SR cluster. For example, if an active-active SR cluster includes four SRs (SR0, SR1, SR2, and SR3), where SR0, SR1 and SR3 have been active, while SR2 had failed, but now is recovering, then each of SR0, SR1 and SR3 will individually perform the steps described in FIG. 7. In addition, once the SR2 fully recovers and becomes active, the SR2 will configure its own port IP addresses when such are released by the SR that temporarily held the SR2's addresses.

Each of the SR0, SR1 and SR3 may perform the steps described in FIG. 7 individually and independently of other SRs, and the purpose of performing the steps is to determine, by each of the SR0, SR1 and SR3 independently from other SRs, whether it has configured a port IP address of the SR2 on its own port.

In step 702, an active SR determines, based on communications exchanged via a BFD channel, that a particular SR has come back and has become active.

In step 704, the active SR determines, based on content of its own IP address ownership vector, whether a port IP address of the particular SR was configured on a port of the active SR.

If, in step 706, the active SR determines that the port IP address of the particular SR was configured on the active SR, then the active SR proceeds to performing step 710. Otherwise, the active SR proceeds to performing step 714.

In step 710, the active SR releases the port IP address of the particular SR. This may also include generating and sending a GARP message to propagate the event to hypervisors implemented in host machines in the network.

In step 712, the active SR updates the content of its own IP address ownership vector. This may be illustrated referring to FIG. 6, in which content 616 of IP address vector 612 is updated to content 626 of IP address vector 622 to overwrite a bit value of "1" on the third position (corresponding to the SR2) to a bit value of "0" on the third position to indicate that the SR0 has released the port IP address of the SR2.

In step 714, the active SR continues monitoring communications exchanged via the BFD channel. This may include determining whether other SRs remain active, whether previously failed SRs came back and became active, and/or whether the active SR itself remains active.

The process described in steps 702-714 may be repeated each time an active SR receives, via a BFD channel, an indication that another SR has become active.

The process described in steps 702-714 may be repeated by each active SR independently of other SRs. An active SR executes the steps 702-714 only to find out if it needs to release a port IP address of a particular SR that has become active. If the active SR determines that it needs to release the port IP address of the particular SR, then the active SR does so. But, if the active SR determines that it cannot release the port IP address of the particular SR, then the active SR continues its operations as usually, and continues routing the traffic to the port IP address that was used by the particular SR in the past.

8. Improvements Provided by Certain Embodiments

In an embodiment, an approach provides mechanisms for moving logical resources without explicit negotiations between service routers in a high availability active-active SR cluster. The approach is applicable to any number of SRs, any number of failures, and any number of recoveries of SRs in the cluster.

In an embodiment, the process improves distribution of port IP addresses of the failed SRs among the surviving SRs. It also improves reliability of a high availability, active-active SR cluster because it does not require any explicit communications between active SRs in the cluster in terms of selecting a surviving peer SR to become responsible for configuring a port IP address of a failed SR. Each of the surviving peer SRs may independently determine whether it needs to become responsible for taking over one or more port IP addresses of the failed SR. The peer SR determines whether it is responsible for taking over the port IP addresses of the failed SR without communicating with other SRs.

In an embodiment, the process improves reliability of a high availability active-active SR cluster because it does not require any explicit communications between active SRs in an active-active SR cluster in terms of releasing a port IP address of a failed SR once the SR becomes active again. Each of the active SRs may independently determine whether it has been configured with the port IP address of the failed SR, and once the failed SR becomes active, release the port IP address of the now-recovered SR.

The presented approach is deterministic because the same rank assignments are known to each of the SRs in advance, and each of the SRs applies the same algorithm to compute hashes and to find the maximum of the computed hash values. Therefore, in an event that a particular SR fails, there will always be one surviving SR that will become responsible for configuring an IP address of the failed SR.

9. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

8. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method comprising:
   determining, by an active service router ("SR") from a plurality of service routers ("SRs") implemented in an active-active SR cluster, that a particular SR has failed;
   obtaining, by the active SR, a plurality of hash values computed for the particular SR;
   wherein the plurality of hash values comprises a hash value determined for the active SR;
   determining, by the active SR, a maximum hash value of the plurality of hash values;
   determining, by the active SR, whether the maximum hash value corresponds to the hash value determined for the active SR;
   in response to determining that the maximum hash value corresponds to the hash value determined for the active SR:

determining, by the active SR, whether the maximum hash value corresponds only to the hash value determined for the active SR; and in response to determining that the maximum hash value corresponds only to the hash value determined for the active SR, configuring, by the active SR, a port IP address of the particular SR on the active SR.

2. The method of claim 1, further comprising:

determining, by the active SR, that the particular SR has become active;

determining, by the active SR, based on content of an IP address ownership vector of the active SR, whether the port IP address of the particular SR was configured on the active SR;

in response to determining that the port IP address of the particular SR was configured on the active SR:
  releasing, by the active SR, the port IP address of the particular SR; and
  updating, by the active SR, content of the IP address ownership vector of the active SR to indicate that the active SR has released the port IP address of the particular SR.

3. The method of claim 2, further comprising:

in response to determining that the maximum hash value corresponds to the hash value determined for the active SR:
  determining whether the maximum hash value also corresponds to a hash value of another active SR of the plurality of SRs;
  in response to determining that maximum hash value also corresponds to a hash value of a second active SR of the plurality of SRs:
    determining a rank of the active SR and a rank of the second active SR;
    determining whether the rank of the active SR is greater than the rank of the second active SR; and
    in response to determining that the rank of the active SR is greater than the rank of the second active SR, configuring the port IP address of the particular SR on the active SR.

4. The method of claim 3, further comprising:

in response to determining that the rank of the active SR is not greater than the rank of the second active SR, continuing monitoring the BFD channel established between the plurality of SRs.

5. The method of claim 4, further comprising:

in response to determining that the maximum hash value does not correspond to the hash value determined for the active SR, continuing monitoring the BFD channel established between the plurality of SRs.

6. The method of claim 5, further comprising monitoring the BFD channel established between the plurality of SRs to detect messages transmitted by the plurality of SRs;

determining, by the active SR of the plurality of SRs, whether the particular SR sent, via the BFD channel, a message within a particular time period; and in response to determining that the particular SR has not sent, via the BFD channel, a message within a particular time period, determining that the particular SR has failed.

7. The method of claim 1, further comprising:

computing, by the active SR, the plurality of hash values for the particular SR by applying a hash function to one or more pairs of ranks of one or more SR of the plurality of SRs;

and wherein a hash value, of the plurality of hash values, that was computed for the particular SR and another SR represents an ability of another SR to configure the port IP address of the particular SR on another SR.

8. One or more non-transitory computer-readable storage media storing one or more computer instructions which, when executed by one or more processors, cause the one or more processors to perform:

determining, by an active service router ("SR") from a plurality of service routers ("SRs") implemented in an active-active SR cluster, that a particular SR has failed;

obtaining, by the active SR, a plurality of hash values computed for the particular SR;

wherein the plurality of hash values comprises a hash value determined for the active SR;

determining, by the active SR, a maximum hash value of the plurality of hash values;

determining, by the active SR, whether the maximum hash value corresponds to the hash value determined for the active SR;

in response to determining that the maximum hash value corresponds to the hash value determined for the active SR:
  determining, by the active SR, whether the maximum hash value corresponds only to the hash value determined for the active SR; and
  in response to determining that the maximum hash value corresponds only to the hash value determined for the active SR, configuring, by the active SR, a port IP address of the particular SR on the active SR.

9. The one or more non-transitory computer-readable storage media of claim 8, comprising additional instructions which, when executed by the one or more processors, cause the one or more processors to perform:

determining, by the active SR, that the particular SR has become active;

determining, by the active SR, based on content of an IP address ownership vector of the active SR, whether the port IP address of the particular SR was configured on the active SR;

in response to determining that the port IP address of the particular SR was configured on the active SR:
  releasing, by the active SR, the port IP address of the particular SR;
  updating, by the active SR, content of the IP address ownership vector of the active SR to indicate that the active SR has released the port IP address of the particular SR.

10. The one or more non-transitory computer-readable storage media of claim 9, comprising additional instructions which, when executed by the one or more processors, cause the one or more processors to perform:

in response to determining that the maximum hash value corresponds to the hash value determined for the active SR:
  determining whether the maximum hash value also corresponds to a hash value of another active SR of the plurality of SRs;
  in response to determining that maximum hash value also corresponds to a hash value of a second active SR of the plurality of SRs:
    determining a rank of the active SR and a rank of the second active SR;
    determining whether the rank of the active SR is greater than the rank of the second active SR; and in response to determining that the rank of the active SR is greater than the rank of the second active SR, configuring the port IP address of the particular SR on the active SR.

11. The one or more non-transitory computer-readable storage media of claim 10, comprising additional instructions which, when executed by the one or more processors, cause the one or more processors to perform:
in response to determining that the rank of the active SR is not greater than the rank of the second active SR, continuing monitoring the BFD channel established between the plurality of SRs.

12. The one or more non-transitory computer-readable storage media of claim 11, comprising additional instructions which, when executed by the one or more processors, cause the one or more processors to perform:
in response to determining that the maximum hash value does not correspond to the hash value determined for the active SR, continuing monitoring the BFD channel established between the plurality of SRs.

13. The one or more non-transitory computer-readable storage media of claim 12, comprising additional instructions which, when executed by the one or more processors, cause the one or more processors to perform:
monitoring the BFD channel established between the plurality of SRs to detect messages transmitted by the plurality of SRs;
determining, by the active SR of the plurality of SRs, whether the particular SR sent, via the BFD channel, a message within a particular time period; and
in response to determining that the particular SR has not sent, via the BFD channel, a message within a particular time period, determining that the particular SR has failed.

14. The one or more non-transitory computer-readable storage media of claim 8, comprising additional instructions which, when executed by the one or more processors, cause the one or more processors to perform:
computing, by the active SR, the plurality of hash values for the particular SR by applying a hash function to one or more pairs of ranks of one or more SR of the plurality of SRs;
and
wherein a hash value, of the plurality of hash values, that was computed for the particular SR and another SR represents an ability of another SR to configure the port IP address of the particular SR on another SR.

15. A service router implemented in a computer appliance node, the service router comprising:
one or more processors;
one or more memory units; and
one or more non-transitory computer-readable storage media storing one or more computer instructions which, when executed by the one or more processors, cause the one or more processors to perform:
determining, by an active service router ("SR") from a plurality of service routers ("SRs") implemented in an active-active SR cluster, that a particular SR has failed;
obtaining, by the active SR, a plurality of hash values computed for the particular SR;
wherein the plurality of hash values comprises a hash value determined for the active SR;
determining, by the active SR, a maximum hash value of the plurality of hash values;
determining, by the active SR, whether the maximum hash value corresponds to the hash value determined for the active SR;
in response to determining that the maximum hash value corresponds to the hash value determined for the active SR:
determining, by the active SR, whether the maximum hash value corresponds only to the hash value determined for the active SR; and
in response to determining that the maximum hash value corresponds only to the hash value determined for the active SR, configuring, by the active SR, a port IP address of the particular SR on the active SR.

16. The service router of claim 15, storing additional instructions which, when executed by the one or more processes, cause the one or more processors to perform:
determining, by the active SR, that the particular SR has become active;
determining, by the active SR, based on content of an IP address ownership vector of the active SR, whether the port IP address of the particular SR was configured on the active SR;
in response to determining that the port IP address of the particular SR was configured on the active SR:
releasing, by the active SR, the port IP address of the particular SR;
updating, by the active SR, content of the IP address ownership vector of the active SR to indicate that the active SR has released the port IP address of the particular SR.

17. The service router of claim 16, storing additional instructions which, when executed by the one or more processes, cause the one or more processors to perform:
in response to determining that the maximum hash value corresponds to the hash value determined for the active SR:
determining whether the maximum hash value also corresponds to a hash value of another active SR of the plurality of SRs;
in response to determining that maximum hash value also corresponds to a hash value of a second active SR of the plurality of SRs:
determining a rank of the active SR and a rank of the second active SR;
determining whether the rank of the active SR is greater than the rank of the second active SR; and
in response to determining that the rank of the active SR is greater than the rank of the second active SR, configuring the port IP address of the particular SR on the active SR.

18. The service router of claim 17, storing additional instructions which, when executed by the one or more processes, cause the one or more processors to perform:
in response to determining that the rank of the active SR is not greater than the rank of the second active SR, continuing monitoring the BFD channel established between the plurality of SRs.

19. The service router of claim 18, storing additional instructions which, when executed by the one or more processes, cause the one or more processors to perform:
in response to determining that the maximum hash value does not correspond to the hash value determined for the active SR, continuing monitoring the BFD channel established between the plurality of SRs.

20. The service router of claim 19, storing additional instructions which, when executed by the one or more processes, cause the one or more processors to perform:
monitoring the BFD channel established between the plurality of SRs to detect messages transmitted by the plurality of SRs;

determining, by the active SR of the plurality of SRs, whether the particular SR sent, via the BFD channel, a message within a particular time period; and in response to determining that the particular SR has not sent, via the BFD channel, a message within a particular time period, determining that the particular SR has failed.

* * * * *